A. L. R. ELLIS.
SPEED INDICATOR.
APPLICATION FILED MAY 8, 1906.

926,861.

Patented July 6, 1909.
2 SHEETS—SHEET 1.

Witnesses:
George W. Tilden.
Helen Oxford

Inventor
Alvarado L. R. Ellis,
by Albert G. Davis
Att'y.

A. L. R. ELLIS.
SPEED INDICATOR.
APPLICATION FILED MAY 8, 1906.

926,861.

Patented July 6, 1909.
2 SHEETS—SHEET 2.

Witnesses:
George H. Tilden.
Helen Oxford

Inventor:
Alvarado L.R. Ellis,
by Albert G. Davis
Att'y.

United States Patent Office.

ALVARADO L. R. ELLIS, OF LYNN, MASSACHUSETTS, ASSIGNOR TO GENERAL ELECTRIC COMPANY, A CORPORATION OF NEW YORK.

SPEED-INDICATOR.

No. 926,861.    Specification of Letters Patent.    Patented July 6, 1909.

Application filed May 8, 1906. Serial No. 315,722.

*To all whom it may concern:*

Be it known that I, ALVARADO L. R. ELLIS, a citizen of the United States, residing at Lynn, in the county of Essex, State of Massachusetts, have invented certain new and useful Improvements in Speed-Indicators, of which the following is a specification.

This invention relates to speed indicators and has for its object the provision of a device of this character which may be used for measuring a wide range of speeds, which will be cheap of construction, simple of operation, and at the same time very reliable, efficient and durable.

My invention relates more specifically to that type of speed indicator or tachometer known as the liquid tachometer. In this type of instrument the speed is indicated by a column of liquid, the height of which is caused to vary as the speed which is to be measured.

The particular type of liquid tachometer to which I have applied my invention comprises a revolving vane or paddle wheel which is rotated by the part the speed of which is to be indicated. This paddle wheel is immersed in a receptacle containing liquid, and provision is made whereby the wheel forces the liquid into an indicator tube, the height to which it will rise depending upon the speed of the wheel. Devices of this character are well-known and it is one of the objects of my invention to improve this type of instrument so that it may be used for a variety of speeds while having substantially the same range of movement in the indicating tube.

Another object of my invention is to produce a liquid tachometer which will have no joints below the level of the operating liquid, so that there will be no leakage.

My invention further consists in the features of construction and in the arrangement and combination of elements hereinafter set forth and particularly pointed out in the claims annexed to and forming a part of this application.

Figure 1:
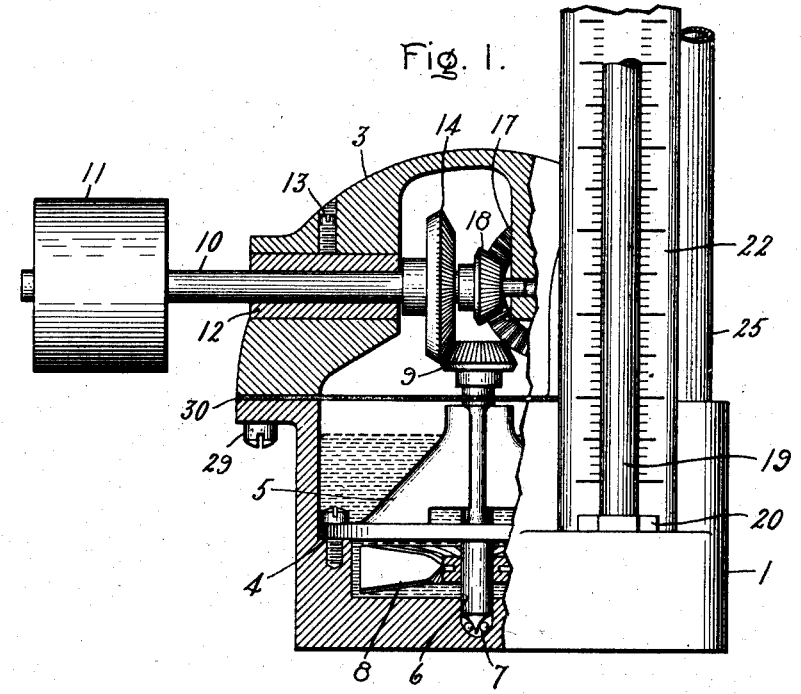
Figure 2:
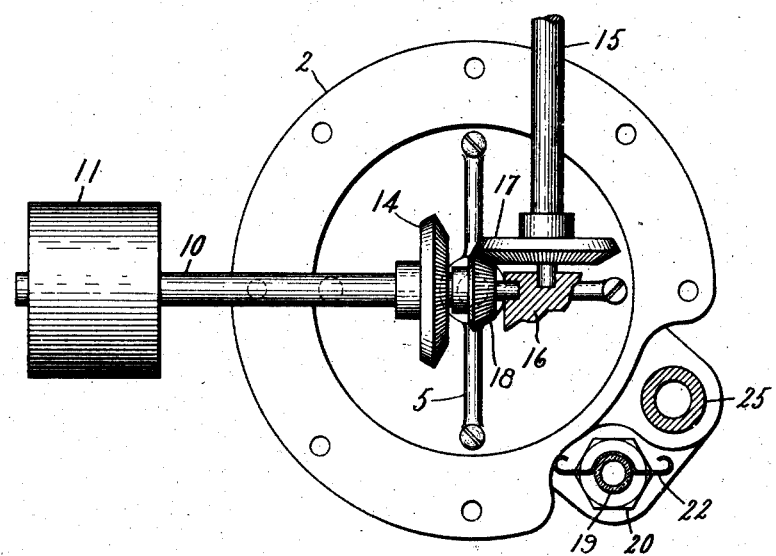
Figure 3:
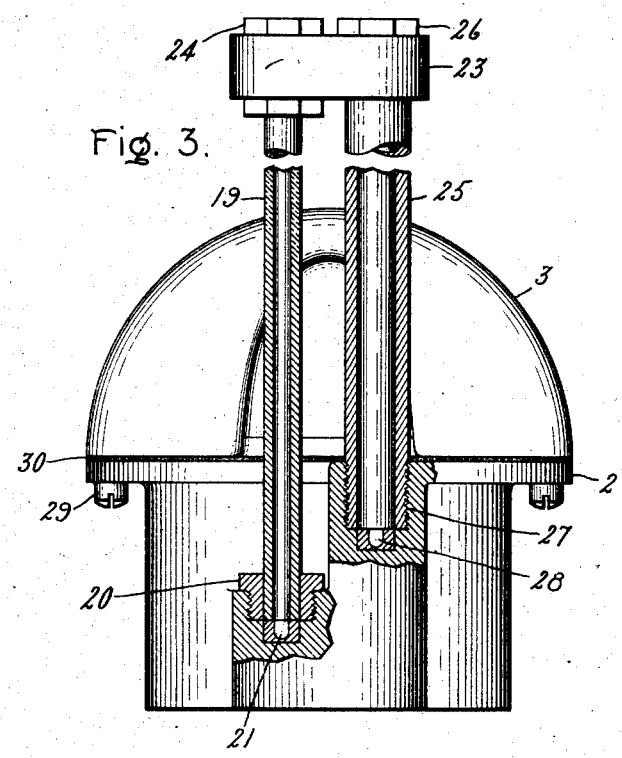

In the drawings, in which I have shown my invention embodied in a specific type of mechanism, Figure 1 represents a front elevation of my device, partly in section; Fig. 2 is a plan view of the same with the cover removed, certain parts being in section; Fig. 3 is a side elevation of my device shown partly in section; and Fig. 4 is a sectional elevation of a modified form of my invention.

Referring to the drawings, 1 represents a liquid receptacle which may be of any suitable form and material. It is preferably, however, cast in circular form, as shown, having a wide flange 2 adapted for receiving a cover 3. The bottom of the receptacle is chambered out so as to have a smaller diameter, forming a shoulder 4 for supporting the bracket 5. This bracket forms a bearing for the shaft 6, preferably mounted in ball bearings 7 in the bottom of the receptacle. A paddle wheel or pumping element 8 is keyed to this shaft within the chambered portion of the receptacle and has a diameter slightly less than this portion of the receptacle. The shaft passes through the bracket 5 and is provided at its upper end with a bevel gear 9 extending above the receptacle. The cover 3 is cut away so as to receive this gear and also the gears which drive it. A shaft 10, provided with a driving pulley 11, is mounted in the cover 3, a bushing 12—which may be of anti-friction metal—being provided and secured in place by means of a set screw 13. The shaft 10 extends within the cover and at its inner end is provided with a bevel gear 14 keyed thereto and meshing with gear 9. A second shaft 15, preferably at right angles to the shaft 10, extends through the cover, the two shafts 15 and 10 having an inner bearing in the cover, as shown at 16. Shaft 15 has also secured to it a bevel gear 17 meshing with a bevel gear 18 secured to the inner end of shaft 10. From the arrangement of gearing it will be seen that the shaft 6 may be driven by either of the shafts 10 or 15, the ratio of the gearing preferably being such that when it is driven from shaft 15 it will be revolved much faster than when driven by shaft 10. An indicator tube 19, preferably of glass, is mounted in the receptacle 1 and secured in place by means of a packing nut 20. This tube extends down to the chambered portion of the receptacle adjacent to the paddle wheel 8 and communicates with the chamber by means of a passage 21. A properly graduated scale 22 is arranged adjacent to the indicator tube and may be graduated so as to read in revolutions per minute, if desired. The upper end of the tube is secured in place by means of a support 23 and packing nut 24. This support is hollow, so as to form a passage between the indicator tube and a second tube 25 which may be of any desired material and which is also secured to the support by means of the nut 26. This tube, which may be of iron or brass, has its lower end threaded into the receptacle at 27 and communicates with a passage 28, which leads back into the upper portion of the receptacle. The mode of operation of this form of my device is very simple. When either of the shafts 10 or 15 is rotated the paddle wheel 8 is likewise rotated, forcing the liquid—which may be water or mercury—up into the indicator tube, the height to which it rises depending upon the speed of rotation, so that if the scale be properly graduated the height will indicate the revolutions of the shaft. In case the speed becomes excessive and the liquid rises too high in the tube, it will flow through the passage in support 23 and back through the tube 25 to the receptacle.

By the construction which I have shown the receptacle may be made of a single casting and no joints will be below the level of the liquid. The cover will be secured to the receptacle by means of screws 29, a gasket 30 being interposed to make a tight joint. Either shaft 10 or 15—depending upon the speed to be measured—may be used. The shafts are arranged at right angles, so that when one shaft is being used an accurate check will be given to the instrument by measuring the speed of the other shaft.

Figure 4:
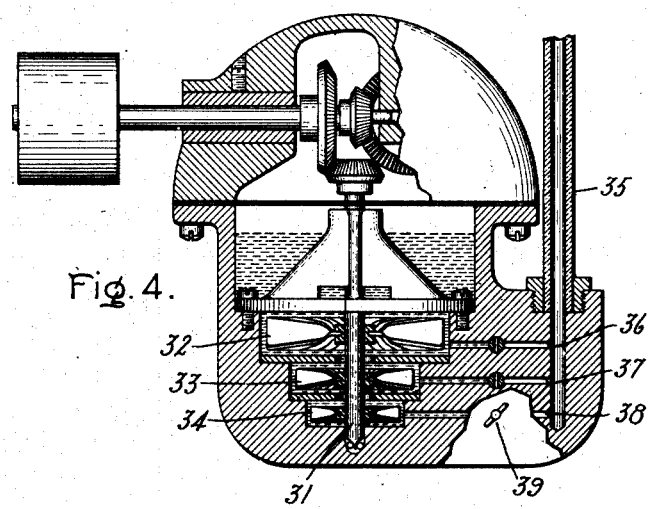

In Fig. 4 I have shown a modified form of my invention, in which another or additional arrangement is provided for adapting the machine to a variety of speeds. The shaft 31 is provided with a plurality of paddle wheels constituting pumps, in this case three in number, 32, 33 and 34. These wheels are preferably of a diameter such that the indications in the tube 35 will be multiples of each other. The receptacle in this form is provided with a chamber for each wheel and passages 36, 37 and 38—one for each chamber—communicating with the indicator tube. In each passage is a valve 39 which may be operated to open or close the passage, as desired. By this construction it will be seen that a long scale instrument is produced without the disadvantage of the long glass tube, which is liable to be broken. In case the speed to be measured is low, passages 37 and 38 may be closed and the wheel 32—which is the largest of the series—will operate and pump the liquid up the tube. The diameter of the wheels is preferably such that the range in the glass tube may be kept substantially the same by using the proper paddle wheel. This arrangement may be used with the two drive shafts, if desired. It should be understood that by the term "pump", as herein used, is meant any device whereby a head of liquid is produced.

It will thus be seen that I have provided a tachometer which is exceedingly simple and cheap to construct. The receptacle is simply cast in one piece and all joints are above the level of the liquid. I have further provided an instrument which can be used for both high and low speeds without changing the length of the indicator tube.

While I have shown and described a specific construction and arrangement of parts, it should be understood that I do not limit my invention except in so far as it is limited by the scope of the claims annexed hereto.

What I claim as new and desire to secure by Letters Patent of the United States, is:

1. A speed indicator comprising a liquid receptacle, a pump and pump shaft mounted therein, a cover for said receptacle, and a pair of drive shafts mounted in said cover at an angle with each other and operatively connected with said pump shaft for driving the latter at different speeds.

2. A speed indicator comprising a liquid receptacle, a pump and a shaft vertically mounted therein, a cover for said receptacle, and a pair of horizontal drive shafts mounted in said cover at an angle with each other and operatively connected with said pump shaft for driving the latter at different speeds.

3. A speed indicator comprising a liquid receptacle, a pump and pump shaft mounted therein, a pair of drive shafts at an angle with each other and arranged to drive said pump shaft at different speed ratios.

4. A speed indicator comprising a liquid receptacle, a pump and a pump shaft vertically mounted therein, a pair of horizontal drive shafts at an angle with each other and arranged to drive said pump shaft at different speed ratios.

5. A speed indicator comprising a liquid receptacle, an indicator tube, a plurality of pumps mounted in said receptacle, and means for opening or closing communication between said tube and any of said pumps at will.

6. A speed indicator comprising a liquid receptacle, an indicator tube, a plurality of pumps mounted in said receptacle, and means for rendering any of said pumps effective in forcing liquid into said tube.

7. A speed indicator comprising a liquid receptacle, an indicator tube, a drive shaft, a plurality of paddle wheels driven thereby, and means for rendering any of said wheels effective in forcing liquid into said tube.

8. A speed indicator comprising a liquid receptacle, an indicator tube communicating therewith, a drive shaft, a plurality of pumps driven thereby each having a passage communicating with said tube, and means for opening or closing any of said passages at will.

9. A speed indicator comprising a liquid receptacle, an indicator tube communicating therewith, a drive shaft, a plurality of pumps of different capacities driven thereby each having a passage communicating with said tube, and means for opening or closing any of said passages at will.

10. A speed indicator comprising a liquid receptacle, an indicator tube communicating therewith, a vertical drive shaft, a plurality of paddle wheels mounted on said shaft each having a passage communicating with said tube, and means for opening or closing any of said passages at will.

11. A speed indicator comprising a liquid receptacle, an indicator tube communicating therewith, a cover for said receptacle having a drive shaft mounted therein, a vertical shaft driven by said drive shaft, a plurality of paddle wheels mounted on said vertical shaft each having a passage communicating with said tube, and means for opening or closing any of said passages at will.

12. A speed indicator comprising a liquid receptacle and a cover therefor, a shaft vertically mounted in said receptacle, a pair of drive shafts mounted in said cover and arranged to drive said vertical shaft at different speeds, an indicator tube, a plurality of paddle wheels mounted on said vertical shaft each having a passage communicating with said tube, and means for opening or closing any of said passages at will.

In witness whereof, I have hereunto set my hand this fifth day of May, 1906.

ALVARADO L. R. ELLIS.

Witnesses:
JOHN A. McMANUS, JR.,
HENRY O. WESTENDARP.